O. J. VICKERS.
AIR BRAKE COUPLING.
APPLICATION FILED JUNE 20, 1917.

1,260,101.

Patented Mar. 19, 1918.
3 SHEETS—SHEET 1.

WITNESS
J. H. Crawford

INVENTOR
O. J. Vickers,
BY Victor J. Evans
ATTORNEY

O. J. VICKERS.
AIR BRAKE COUPLING.
APPLICATION FILED JUNE 20, 1917.
1,260,101.
Patented Mar. 19, 1918.
3 SHEETS—SHEET 2.
Fig. 3.
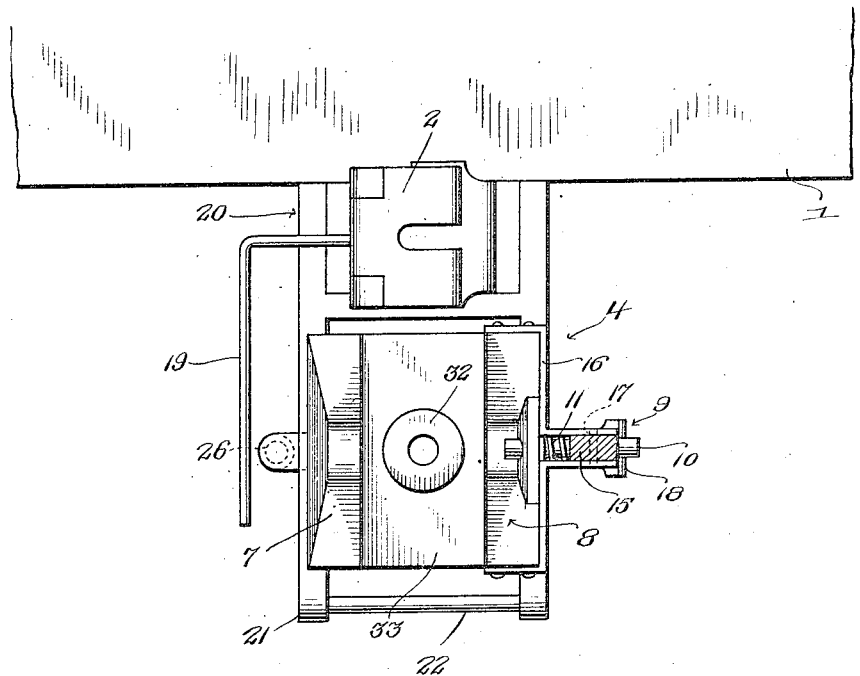
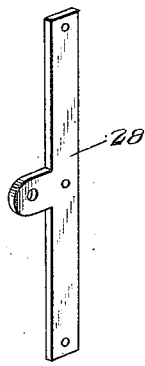
Fig. 6.
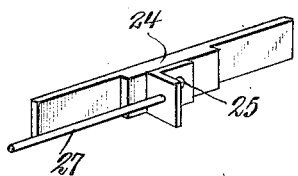
Fig. 7.
WITNESS
J. H. Crawford.
INVENTOR
O. J. Vickers,
BY Victor J. Evans
ATTORNEY

O. J. VICKERS.
AIR BRAKE COUPLING.
APPLICATION FILED JUNE 20, 1917.

1,260,101.

Patented Mar. 19, 1918.

INVENTOR
O. J. Vickers,
BY Victor J. Evans
ATTORNEY

WITNESS
J. H. Crawford.

UNITED STATES PATENT OFFICE.

OREN J. VICKERS, OF GASPARILLA, FLORIDA.

AIR-BRAKE COUPLING.

1,260,101. Specification of Letters Patent. Patented Mar. 19, 1918.

Application filed June 20, 1917. Serial No. 175,875.

*To all whom it may concern:*

Be it known that I, OREN J. VICKERS, a citizen of the United States, residing at Gasparilla, in the county of De Soto and State of Florida, have invented new and useful Improvements in Air-Brake Couplings, of which the following is a specification.

This invention comprehends improvements in air brake couplings, and has for its primary object the provision of an automatic coupling which is positive in operation, and which will cut off the air when broken.

Another object of the invention is to provide an air brake coupling for use primarily on freight and passenger trains, consisting of two coupling members each adapted for connection with the air line and each pivotally and slidably mounted within a frame.

Another object of the invention resides in the provision of an automatic coupling of this nature, which will couple and uncouple with the coupling and uncoupling of the train, and so do away with the dangerous manual performance of these operations.

A still further object of the invention is to provide an air brake coupling of extremely simple and practical construction, which may be cheaply manufactured, quickly installed, and which will be a general improvement over devices of a similar nature now in use.

With these and other objects in view, the invention consists in the construction, combination, and arrangement of parts hereinafter set forth and falling within the scope of the claims.

In the accompanying drawings:—

Fig. 3 is an outside end elevation of one of the air brake coupling members.

Fig. 6 is a perspective view of one of the plates which serve as an abutment for the springs associated with the carriages in which the coupling members are mounted.

Fig. 7 is a perspective view of one of the slide bars which comprises a part of a carriage for a coupling member.

Figure 1:
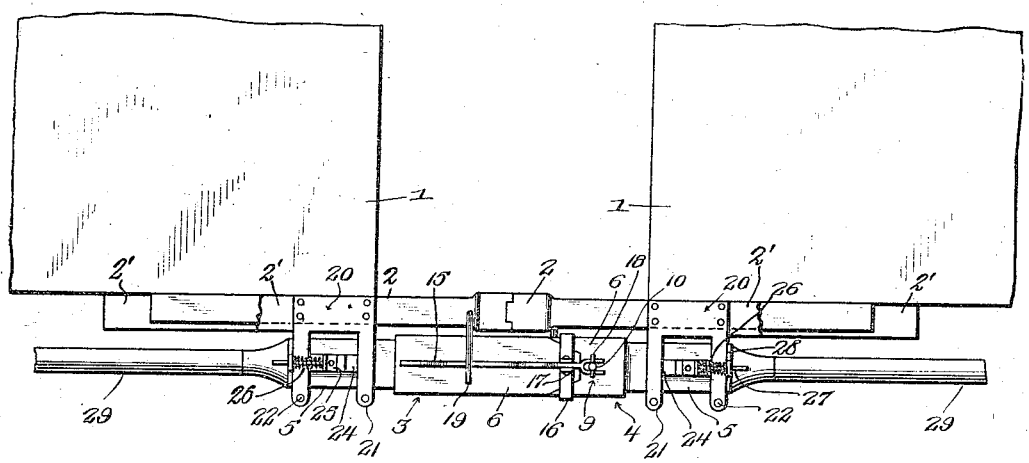
Figure 1 is a side elevation, showing the coupling in use.
Figure 2:
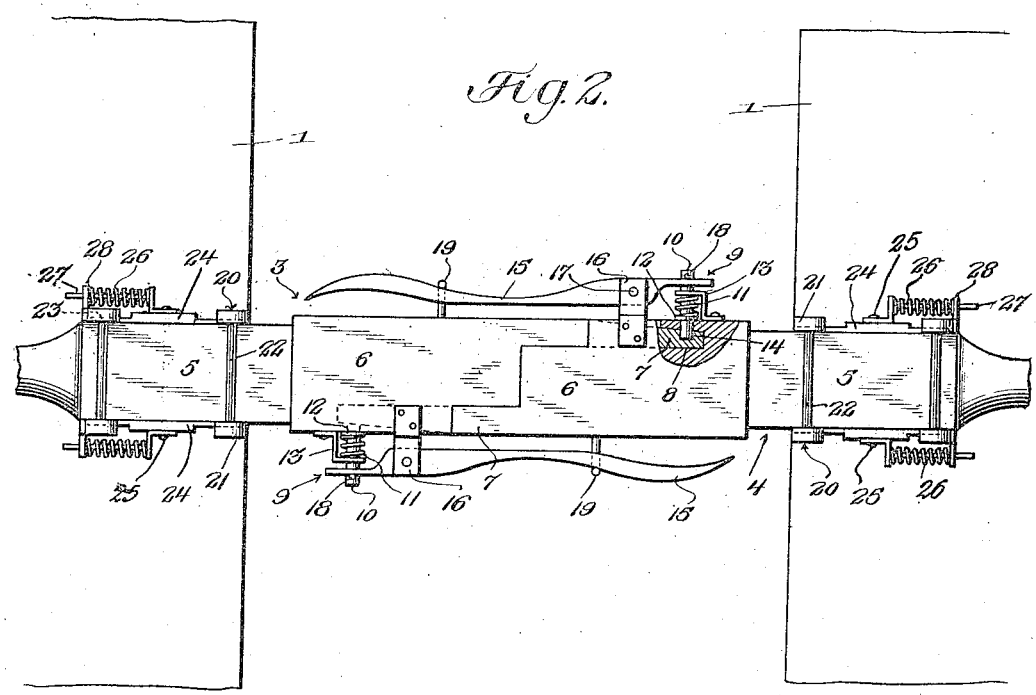
Fig. 2 is a bottom plan view.
Figure 4:
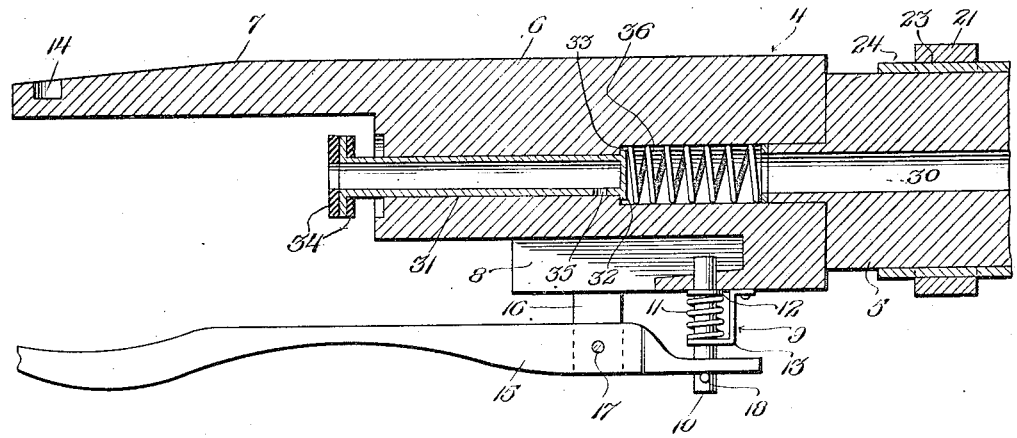
Fig. 4 is a horizontal sectional view through a coupling member.
Figure 5:
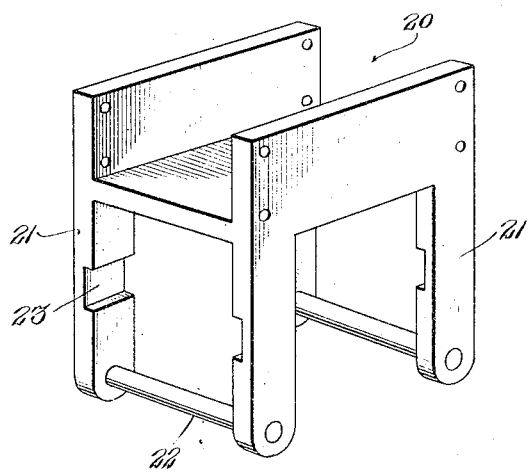
Fig. 5 is a perspective view of the frame in which the carriage for a coupling member is mounted.

Referring in detail to the drawings by numerals, 1 designates a pair of cars of any description having the customary car coupling 2, which may be of any type that will not interfere with the proper operation of the air brake coupling.

The air brake coupling comprises the coupling members 3 and 4 of similar construction, which are mounted under the cars and which project beyond the ends thereof as shown in the drawings, and as will be hereinafter fully described.

Each of the coupling members comprises a body 5 having at its forward end a head 6 formed on the outer end thereof adjacent to one side with an outwardly extending tongue 7 tapering toward its terminal, as shown. On the side of the head opposite to the tongue and rearwardly thereof is formed a socket or housing 8 for the reception of the tongue 7 on the complementary coupling member. This housing is formed with a flared outer end so that the tongue may easily slide into the socket even when the cars are not in exact alinement or at the same level.

To automatically lock the tongue 7 within the socket or housing 8, a catch 9 is employed, comprising a pin 10 disposed at right angles to the lateral face of the socket 8 and projecting into the socket through an opening in the wall thereof. This pin is normally held in locking position by an expansive helical spring 11 abutting at one end against a collar 12 and at the other end against a bracket 13 attached to the socket 8 and through which the pin slides.

To automatically withdraw the locking pin from its socket and from engagement with a recess 14 in the corresponding tongue 7, I provide a lever 15 pivotally mounted between brackets 16 on a vertical pivot 17. The inner end of the lever is formed to embrace the locking pin 10 and is held in loose connection therewith by a pin 18.

The lever 15 has its outer edge in the form of an ogee curve. The lever is of such length and so positioned that when the cars are coupled it will slidably engage a rod 19 and be forced inwardly so as to withdraw the locking pin 10 from its socket, allowing the tongue to enter the socket. As the cars come into close engagement, the rod 19 is carried opposite the depression in the outer face of the lever so that the locking pin 10 may become operative. When the cars are uncoupled, the rod 19 by engagement with the lever 15 will release the locking pin, and from this it is seen that the coupling is entirely automatic.

Each of the coupling members is slidably and pivotally mounted within a frame 20 which may be secured to the draw sills 2' as shown in the drawing. The frame 20 has four depending legs 21 connected in pairs at their lower extremities by transverse bolts 22. Slots 23 are formed in the inner faces of the legs 21 to receive slide bars 24 which provide a carriage for the coupling member. Each bar is enlarged intermediate its ends to provide abutments for engagement with the legs to limit the longitudinal movement of the bar, and each bar is connected to its coupling member by a horizontal pivot or trunnion 25 affording pivotal motion to the coupling member.

To hold the coupling members normally in extended positions helical springs 26 are employed, and each spring is mounted upon a rod 27 attached to a slide bar 24 and movable through a plate 28 which forms an abutment for the spring 26. This method of mounting the coupling member provides for a pivotal movement in a vertical plane and a reciprocatory motion. Each of the coupling members is connected to the air line 29 and is formed with a bore or passage 30 running its entire length. In the outer restricted end of the passage is positioned a sliding valve 31 having an enlarged head 32 which seats against the shoulder 33 when closed. The outer end of the valve 31 is flanged, and provided with rubber gaskets 34 to prevent leakage when in operation.

When the coupling is connected, the flanged ends of the two valves will meet, and the valves will be forced inwardly against the tension of their springs to unseat the heads 32, thereby establishing air connection through ports 35, which are then uncovered.

When the coupling is connected, the pivotal mounting of the coupling members allows for a difference in height of the two cars. The springs 26 which force the coupling members outwardly, and the springs 36 which force the valves outwardly, are a check on one another, and insure tight and permanent connection between the two valves when the coupling is operated.

From the foregoing description taken in connection with the accompanying drawings, it will be apparent that I have provided a very simple, practical and efficient air brake coupling adaptable for use on cars of any type.

While I have herein shown and described the preferred form of my invention by way of illustration, I wish it to be understood that I do not limit or confine myself to the precise details of construction herein described and delineated, as modification and variation may be made within the scope of the claims and without departing from the spirit of the invention.

I claim:—

1. An air brake coupling member having an air passage extending therethrough, a frame attachable to a car through which said coupling member extends, the inner faces of said frame on opposite sides of the coupling member being slotted, slide bars mounted within said slots, horizontal pivotal means connecting said coupling member to said slide bars, and resilient means for holding the coupling member normally in extended position.

2. An air brake coupling member having an air passage extending therethrough, a frame attachable to a car, horizontal slide bars mounted within said frame, abutments on said slide bars for engagement with the frame to limit the longitudinal movement of the slide bars, pivotal connections between the slide bars and the coupling member, and resilient means for holding the coupling member normally in extended position.

In testimony whereof I affix my signature.

OREN J. VICKERS.

Copies of this patent may be obtained for five cents each, by addressing the "Commissioner of Patents, Washington, D. C."